United States Patent
Kim et al.

(10) Patent No.: US 10,652,371 B2
(45) Date of Patent: May 12, 2020

(54) METHOD AND APPARATUS FOR TRANSMITTING AND RECEIVING DATA PACKET IN MULTIMEDIA SYSTEM

(71) Applicant: Samsung Electronics Co., Ltd., Suwon-si, Gyeonggi-do (KR)

(72) Inventors: Dong-Yeon Kim, Seoul (KR); Hyun-Koo Yang, Seoul (KR); Jae-Hyeon Bae, Seoul (KR); Kyung-Mo Park, Seoul (KR); Young-Wan So, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/999,060

(22) PCT Filed: Feb. 17, 2017

(86) PCT No.: PCT/KR2017/001805
§ 371 (c)(1),
(2) Date: Aug. 17, 2018

(87) PCT Pub. No.: WO2017/142365
PCT Pub. Date: Aug. 24, 2017

(65) Prior Publication Data
US 2019/0245951 A1    Aug. 8, 2019

(30) Foreign Application Priority Data

Feb. 17, 2016    (KR) .................. 10-2016-0018791

(51) Int. Cl.
*H04L 29/08*    (2006.01)
*H04L 12/64*    (2006.01)
(Continued)

(52) U.S. Cl.
CPC ............ *H04L 69/324* (2013.01); *H04L 12/64* (2013.01); *H04L 47/34* (2013.01); *H04L 65/607* (2013.01); *H04L 69/22* (2013.01)

(58) Field of Classification Search
CPC .. H04W 28/06; H04W 28/065; H04L 1/1614; H04L 1/0083; H04L 1/0084; H04L 69/22;
(Continued)

(56) References Cited

U.S. PATENT DOCUMENTS

2006/0062192 A1    3/2006  Payne, III
2008/0225838 A1    9/2008  Vesma et al.
(Continued)

FOREIGN PATENT DOCUMENTS

KR    10-2014-0125690 A    10/2014
KR    10-2016-0004858 A    1/2016
(Continued)

OTHER PUBLICATIONS

Extended European Search Report dated Dec. 13, 2018, issued in a counterpart European application No. 17753526.7-1217/3419231.

*Primary Examiner* — Kan Yuen
(74) *Attorney, Agent, or Firm* — Jefferson IP Law, LLP

(57) ABSTRACT

Disclosed is a method for receiving a data packet by a receiving apparatus in a multimedia system, the method comprising: receiving the data packet; obtaining, from a payload header of the data packet, a fragment indicator including information about fragmentation of a data unit in a payload of the data packet and a fragment counter indicating a number of at least one payload containing at least one fragment of the data unit succeeding the payload; and identifying that at least one number indicated by the fragment counter is to be reused in a case that the fragment indicator includes a value indicating that the payload contains a fragment of the data unit that is neither a first nor a
(Continued)

| | MMTP packet flow in order → | | | | | | | | | | |
|---|---|---|---|---|---|---|---|---|---|---|---|
| frag_counter | 255 | 254 | ... | ... | 1 | 0 | b-1 | b-2 | ... | ... | 0 | b≤256 |
| f_i | 01 | 10 | ... | ... | 10 | 10 | 10 | 10 | ... | ... | 11 | |
| FT | 3 | 3 | ... | ... | 3 | 3 | 3 | 3 | ... | ... | 3 | | last fragment, and the fragment counter indicates a number indicating that there is no at least one payload containing the at least one fragment of the data unit succeeding the payload, wherein a total number of fragments of the data unit is larger than a maximum number indicated by the fragment counter.

16 Claims, 12 Drawing Sheets

(51) Int. Cl.
*H04L 12/801* (2013.01)
*H04L 29/06* (2006.01)

(58) Field of Classification Search
CPC ..... H04L 69/166; H04L 47/36; H04L 47/365; H04L 21/434; H04L 21/4345; H04L 21/2362; H04N 19/174
See application file for complete search history.

(56) References Cited

U.S. PATENT DOCUMENTS

| | | |
|---|---|---|
| 2014/0317664 A1 | 10/2014 | Park et al. |
| 2015/0117452 A1 | 4/2015 | Mosko |
| 2017/0142236 A1 | 5/2017 | Park et al. |
| 2017/0142425 A1* | 5/2017 | Iguchi ................. H04N 21/236 |

FOREIGN PATENT DOCUMENTS

| | | |
|---|---|---|
| WO | 2015/065104 A1 | 5/2015 |
| WO | 2016/021153 A1 | 2/2016 |

\* cited by examiner

FIG.7

| frag_counter | 255 | 254 | ... | ... | 1 | 0 | 255 | 254 | ... | ... | 1 | 0 | c-1 | c-2 | ... | 0 |
|---|---|---|---|---|---|---|---|---|---|---|---|---|---|---|---|---|
| f_i | 01 | 10 | ... | ... | 10 | 10 | 10 | 10 | ... | ... | 10 | 10 | 10 | 10 | ... | 11 |
| FT | 3 | 3 | ... | ... | 3 | 3 | 3 | 3 | ... | ... | 3 | 3 | 2 | 2 | ... | 2 |

MMTP packet flow in order → $c \leq 256$

FIG.8

| frag_counter | 255 | 254 | ... | ... | 1 | 0 | 255 | 254 | ... | ... | 1 | 0 | c-1 | c-2 | ... | 0 |
|---|---|---|---|---|---|---|---|---|---|---|---|---|---|---|---|---|
| f_i | 01 | 10 | ... | ... | 10 | 10 | 10 | 10 | ... | ... | 10 | 10 | 10 | 10 | ... | 11 |
| FT | 4 | 4 | ... | ... | 4 | 4 | 3 | 3 | ... | ... | 3 | 3 | 2 | 2 | ... | 2 |

MMTP packet flow in order → $c \leq 256$

METHOD AND APPARATUS FOR TRANSMITTING AND RECEIVING DATA PACKET IN MULTIMEDIA SYSTEM

CROSS-REFERENCE TO RELATED APPLICATION(S)

This application is a U.S. National Stage application under 35 U.S.C. § 371 of an International application filed on Feb. 17, 2017 and assigned application number PCT/KR2017/001805, which claimed the benefit of an Korean patent application filed on Feb. 17, 2016 in the Korean Patent Office and assigned Serial number 10-2016-0018791, the entire disclosure of which is hereby incorporated by reference.

TECHNICAL FIELD

The disclosure relates to a method and apparatus for transmitting and receiving a data packet in a multimedia system.

BACKGROUND ART

Recently considered for multimedia systems is MPEG Media Transport (MMT) technology for the purpose of providing multimedia services to users by transmitting multimedia data containing various types of data files, such as video, audio, application, webpage, or metadata, over a composite network that includes a broadcast network, a communication network, or other networks and simultaneously connect the broadcast network and the communication network.

Such multimedia data correspond to components of a multimedia service that is delivered to a user, and are delivered to the user by splitting into several data units or merging together according to the characteristics of the components of the multimedia service. For example, considering the characteristics of the transmitting scheme according to the type of the data and the characteristics of the network to transmit the data, a transmit end may configure multimedia data into data packets and transmit the data packets. The data packets transmitted from the transmit end are received and configured by a receive end back into the multimedia data that is then served to the user.

The data units which constitute multimedia data may be transmitted to the receive end, with each data unit split into multiple fragments depending on the properties of the network over which the data is transmitted from the transmit end. In a general multimedia system, where one data unit splits into multiple fragments and each data packet is constituted of such fragment, the transmit end may indicate the positions of a fragment included in the data packet, like the first fragment, mid fragment, and last fragment of the data unit, and the transmit end transmits the position information and the respective numbers of the data packets, as fragmentation information about the data unit, to the receive end. The receive end may identify whether all of the data packets including fragments constituting the data unit have been received by looking into the fragmentation information.

However, the conventional art constitutes one data unit with multiple data packets and sends out the data unit without considering the size of the data unit and the size of each of the fragments of the data unit, thus failing to precisely configure the fragmentation information about the data unit. Thus, a need exists for a scheme for more precisely configuring fragmentation information about each data unit of multimedia data.

SUMMARY

The disclosure is proposed a method and apparatus that, if the transmit end splits a data unit constituting multimedia data into multiple fragments, configure the fragmentation information and transmit the fragmentation information to the receive end.

The disclosure is proposed a method and apparatus in which the receive end receives the fragmentation information about the multimedia data from the transmit end and reconfigures the fragments of the data units obtained from the received data packets into the multimedia data based on the received fragmentation information.

As a method according to an embodiment of the present disclosure, a method for receiving a data packet by a receiving apparatus in a multimedia system, the method comprising: receiving the data packet; obtaining, from a payload header of the data packet, a fragment indicator including information about fragmentation of a data unit in a payload of the data packet and a fragment counter indicating a number of at least one payload containing at least one fragment of the data unit succeeding the payload; and identifying that at least one number indicated by the fragment counter is to be reused in a case that the fragment indicator includes a value indicating that the payload contains a fragment of the data unit that is neither a first nor a last fragment, and the fragment counter indicates a number indicating that there is no at least one payload containing the at least one fragment of the data unit succeeding the payload, wherein a total number of fragments of the data unit is larger than a maximum number indicated by the fragment counter.

As another method according to an embodiment of the present disclosure, a method for transmitting a data packet by a transmitting apparatus in a multimedia system, the method comprising: generating a payload header and a payload; and transmitting the data packet including the payload header and the payload, wherein the payload header includes a fragment indicator including information about fragmentation of a data unit in a payload of the data packet and a fragment counter indicating a number of at least one payload containing the at least one fragment of the data unit succeeding the payload, and wherein at least one number indicated by the fragment counter is reused on the basis that a total number of fragments of the data unit is larger than a maximum number indicated by the fragment counter, wherein the reuse of the at least one number is identified based on the fragment indicator and the fragment counter, the fragment indicator including a value indicating that the payload contains a fragment of the data unit that is neither a first nor a last fragment and the fragment counter indicating a number indicating that there is no at least one payload containing the at least one fragment of the data unit succeeding the payload.

As an apparatus according to an embodiment of the present disclosure, a receiving apparatus in a multimedia system, the receiving apparatus comprising: a receiver configured to receive a data packet; and a processor configured to: obtain, from a payload header of the data packet, a fragment indicator including information about fragmentation of a data unit in a payload of the data packet and a fragment counter indicating a number of at least one payload containing at least one fragment of the data unit succeeding the payload, and identify that at least one number indicated by the fragment counter is to be reused in a case that the fragment indicator includes a value indicating that the payload contains a fragment of the data unit that is neither a first nor a last fragment, and the fragment counter indicates a number indicating that there is no at least one payload containing the at least one fragment of the data unit succeeding the payload, wherein a total number of fragments of the data unit is larger than a maximum number indicated by the fragment counter.

As another apparatus according to an embodiment of the present disclosure, a transmitting apparatus in a multimedia system, the transmitting apparatus comprising: a processor configured to generate a payload header and a payload; and a transmitter configured to transmit the data packet including the payload header and the payload, wherein the payload header includes a fragment indicator including information about fragmentation of a data unit in a payload of the data packet and a fragment counter indicating a number of at least one payload containing at least one fragment of the data unit succeeding the payload, and wherein at least one number indicated by the fragment counter is reused on the basis that a total number of fragments of the data unit is larger than a maximum number indicated by the fragment counter, wherein the reuse of the at least one number is identified based on the fragment indicator and the fragment counter, the fragment indicator including a value indicating that the payload contains a fragment of the data unit that is neither a first nor a last fragment and the fragment counter indicating a number indicating that there is no at least one payload containing the at least one fragment of the data unit succeeding the payload.

Other aspects, advantages, and core features of the present disclosure will be apparent to one of ordinary skill in the art from the following detailed description taken in conjunction with the accompanying drawings and disclosing preferred embodiments of the present disclosure.

Before getting into the detailed description of the present disclosure, particular terms or phrases used herein may be defined merely for ease of description. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of." As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

BRIEF DESCRIPTION OF DRAWINGS

FIG. 7 is a view illustrating another example of a method for using a fragment counter and a fragment type if the fragment counter is reused according to an embodiment of the present disclosure;

FIG. 8 is a view illustrating still another example of a method for using a fragment counter and a fragment type if the fragment counter is reused according to an embodiment of the present disclosure;

DETAILED DESCRIPTION

Figure 1:
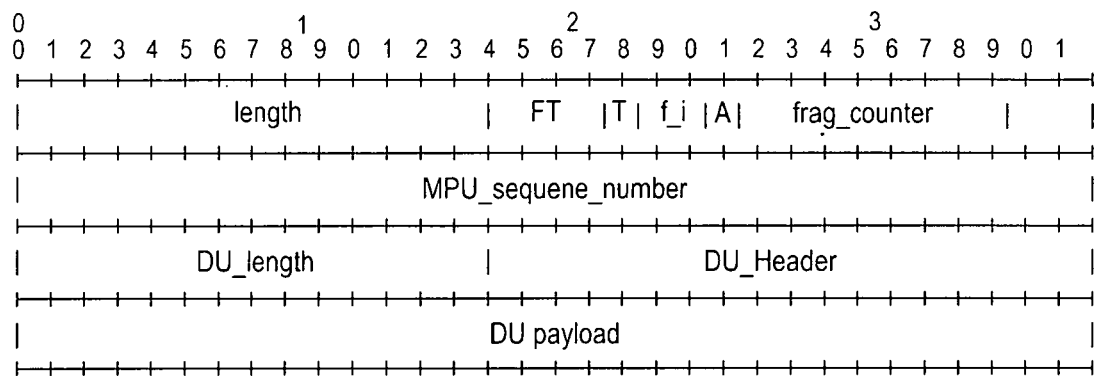
FIG. 1 is an example of a configuration of a header of an MMT packet payload according to an embodiment of the present disclosure.

Hereinafter, embodiments of the present disclosure are described in detail with reference to the accompanying drawings. The same reference numerals are used to refer to same elements throughout the drawings. If determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," if used in this specification, specify the presence of stated features, integers, steps, operations, elements, and/or components, but do not preclude the presence or addition of one or more other features, integers, steps, operations, elements, components, and/or groups thereof.

The present disclosure relates to a method and apparatus in which a transmit end in a multimedia system splits multimedia data, configures fragmentation information about the multimedia data, and transmits the split data and the fragmentation information to a receive end. And, the receive end receives the data packets including the fragmentation information and the split data and reconfigures the split data obtained from the data packets into the multimedia data based on the fragmentation information. Although an MPEG media transport (hereinafter, it will be referred to as 'MMT') system are described as an example for ease of description, an embodiment of the present disclosure may also be applicable to other communication systems than the MMT system.

Specifically, in an embodiment of the present disclosure, a method and apparatus for splitting multimedia data into multiple data units according to the characteristics of each piece of the multimedia data in an MMT system, configuring the split data units into an MMT data packet according to the network environment, and transmit the data packet, are proposed.

Also, in an embodiment of the present disclosure, a method and apparatus for receiving the MMT data packets, and fragmentation information about the MMT data packets, from the transmit end and reconfiguring the split data obtained from the MMT data packets into an MMT data unit based on the received fragmentation information, are proposed.

The following (A) and (B) respectively denote the configuration of an MMT data packet and a method for configuring the MMT data packet according to an embodiment of the present disclosure.

(A) Configuration of MMT Data Packet

An MMT data packet according to an embodiment of the present disclosure may include packet payload data including data, a packet payload header including information regarding the packet payload data, and a packet header including information regarding the MMT data packet.

An MMT data packet according to an embodiment of the present disclosure, may be configured as shown in FIG. 1 as an example.

In the MMT system according to an embodiment of the present disclosure, the multimedia data may be split into multiple data units according to its characteristics, and one data unit may be configured of one or more data packets depending on network conditions and sent out. Here, the characteristics of the multimedia data corresponds to a media fragment unit (MFU) type described below.

According to an embodiment of the present disclosure, it is assumed that one data unit is split to configure multiple data packets. In this case, fragmentation information about the data unit may be configured together with information indicating whether the data units constituting the same type of media service have been split to configure multiple packets and the respective numbers of the split packets and may be included in the packet payload header. Specifically, according to an embodiment of the present disclosure, the information contained in the packet payload header may include, e.g., fragment type, fragment indicator, fragment counter, and aggregation flag. According to an embodiment of the present disclosure, the information contained in the packet payload header may be defined as follows.

Fragment Type (FT) refers to the type of the media fragment unit (hereinafter, it will be referred to as 'MFU') corresponding to the data unit, contained in the payload of the corresponding packet. Here, MFU refers to the unit obtained by fragmentating the media processing unit (hereinafter, it will be referred to as 'MPU'), which is the minimum unit independently consumable in the MMT system, considering the data transmission efficiency. Examples of the MFU type include MPU metadata, movie fragment metadata, and MFU, etc. Here, the MFU type being 'MFU' means the multimedia data except for all the metadata in the MPU.

Fragment Indicator (f_i) may indicate 'whole' if the data unit contained in the payload of the corresponding packet is not split, or where the payload contains the fragment split from the data unit, may indicate the position information about the fragment. Specifically, where the data unit is an MFU, the fragment indicator indicating 'whole' indicates that the payload of the packet includes the complete MFU that has not been fragmented. And, the fragment indicator indicates position information refers to where one of the multiple fragments split from the MFU is contained in the payload, and the position information may indicate that the fragment contained in the payload is a first fragment, a last fragment, and a mid fragment that is neither the first nor last fragment, among the fragments of the MFU.

Fragment Counter (frag counter) refers to, where the same data unit, i.e., the MFU, is split into a plurality of fragments, the number of the payloads containing the split fragments. In other words, the fragment counter denotes, where the current payload contains one of the split fragments, the number of the payloads containing fragments following one among the plurality of split fragments after the current payload.

Aggregation Flag (A) refers to where the current payload contains one or more data units.

For example, it is assumed that one data unit, i.e., the MFU, is split into 10 fragments, and the split fragments are transmitted in packets. Then, the fragment type of the 10 payloads containing the 10 fragments is 'MFU,' and their aggregation flag is '0,' and the fragment indicator of the first payload containing the first fragment among the 10 fragments indicates that the payload contains the first fragment among the split fragments of the MFU, and the fragment indicator of the payload containing each of the second through ninth fragments among the 10 fragments indicate that the payload contains the remaining fragment, i.e., mid fragment, except for the first and last fragments among the split fragments of the MFU, and the fragment indicator of the tenth payload containing the tenth fragment among the 10 fragments indicates that the payload contains the last fragment among the split fragments of the MFU. The fragment counter of the first payload is set to "9," indicating that the first payload is followed by the nine payloads containing the remaining fragments except for the first fragment among the split fragments of the MFU, and the fragment counters of the subsequent payloads are set to be counted to sequentially decrease one by one, and the fragment counter of the last payload which has no more subsequent payload is set to "0."

(B) Method for Configuring MMT Data Packet

General MMT data packets do not consider the size of data that the multimedia data unit in the MMT system may have and the size of data that the data packet may have depending on the network environment. Thus, where the multimedia data unit is split in various sizes based on the limited size of the data packet, there is needed a method for counting the number of payloads containing the fragments split from the data unit. For example, in the MMT system, as the size of multimedia data gradually increases to, e.g., full high-definition (HD), 4K, or 8K, the size of the data units constituting the multimedia data gradually increases as well. In contrast, the size of packets transmitted over the network is restricted. Hence, the size of the fragment counter field contained in the payload header is restricted too. It is assumed that the fragment counter is an 8-bit field as shown in FIG. 1. In this case, the fragment counter may be represented with numbers from 0 to 255. Accordingly, not where one data unit is split into 256 fragments or less, and a plurality of data packets are configured, with each fragment contained in one payload, but where the data unit is split into 257 fragments or more, and a plurality of data packets are configured with each fragment contained in one payload, there is required a method for representing the number of the data packets constituted of the payloads containing the fragments split from the data unit using the fragment counter.

Largely proposed below are two methods for representing the number of the data packets constituted of payloads containing the split fragments using the fragment counter depending on the number of the data packets constituted of the payloads containing the fragments split from the data unit, according to an embodiment of the present disclosure. Specifically, the first method is counting the number of the data packets corresponding to the payloads containing the split fragments in predetermined units, and the second method is indicating that the data unit has been split into a predetermined unit number of fragments or more and counting the number of the data packets corresponding to the payloads containing the split fragments. Since one data packet is configured of one payload, the number of data packets is interchangeably used below with the number of payloads for ease of description.

According to the first embodiment of the present disclosure, i.e., the embodiment of the first method 1-1 of counting the number of data packets corresponding to payloads containing fragments in predetermined units, it is assumed that one data unit is split into a smaller number of fragments than the 'maximum value' by which one data unit may be expressed as the size of the fragment counter of the packet payload header. In this case, the number of the payloads each containing a respective one of the fragments split from one data unit is smaller than the maximum value. In this case, according to an embodiment of the present disclosure, the value of the fragment counter contained in the packet payload header denotes the number of the payloads containing the remaining fragments after a reference fragment contained in the current payload among the plurality of fragments split from the same data unit. Accordingly, the fragment indicator of the last payload indicates that the fragment contained in the last payload is the last one among the plurality of fragments split from the same data unit and that the payload is the payload of the last data packet among the data packets configured for the same data unit.

In embodiment 1-2), it is assumed that one data unit is split into a larger number of fragments than the 'maximum value' that may be expressed as the size of the fragment counter field of the packet payload header. In this case, the number of the payloads containing the fragments split from the same data unit is larger than the number representable with the maximum value. Thus, according to an embodiment of the present disclosure, the fragment counter value may be repeatedly used as the unit of the maximum value. In other words, it is assumed that the maximum value of the fragment counter field of the payload header is 'X' and X+b fragments split from one data unit are contained in their respective corresponding payloads (where, b is a number equal or smaller than X). In this case, if the maximum value of the fragment counter of the payload header is X, the fragment counter value for each of the first X payloads among the X+b consecutive payloads may be counted to be sequentially decreased by one to zero, starting from X−1. The fragment counter value for each of the subsequent b payloads may also be counted, starting from b−1, to be sequentially reduced by one to zero. In this case, thus, the fragment counter may indicate the number of the payloads containing the remaining fragments to follow the current payload, every X units, for the fragments split from the same data unit.

Figure 2:
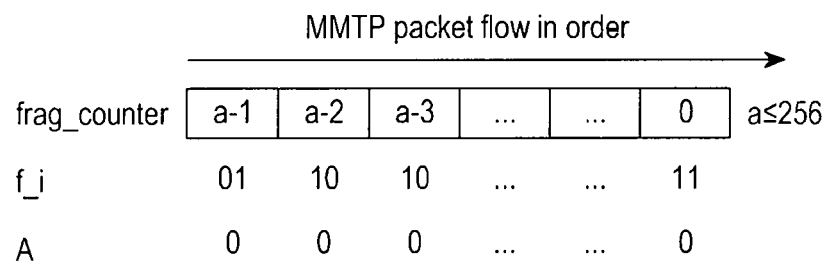
FIG. 2 is a view illustrating an example of a method for counting the number of payloads according to an embodiment of the present disclosure.
Figure 3:
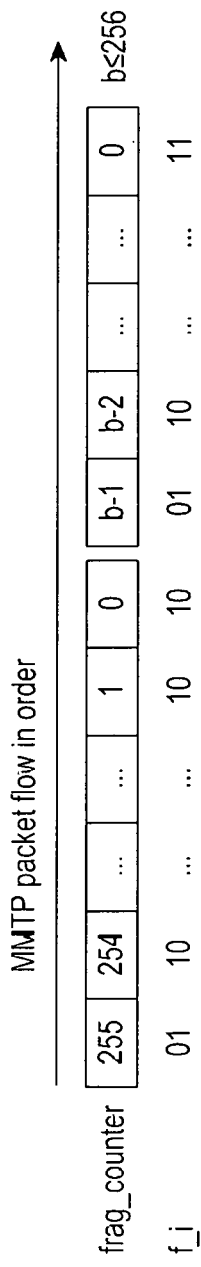
FIG. 3 is a view illustrating another example of a method for counting the number of payloads according to an embodiment of the present disclosure.
Figure 4:
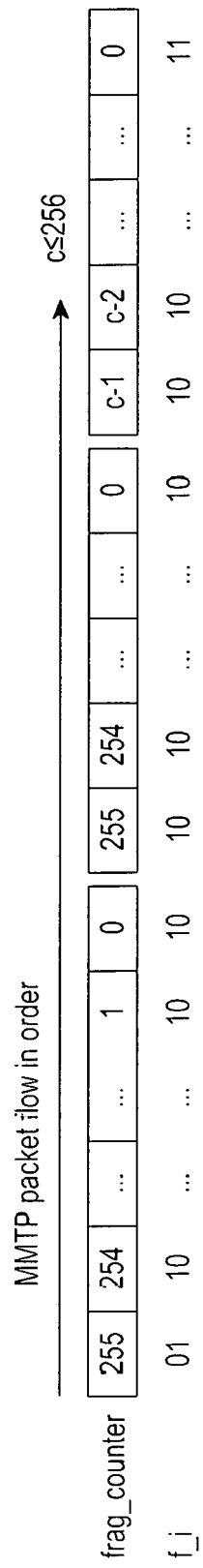
FIG. 4 is a view illustrating still another example of a method for counting the number of payloads according to an embodiment of the present disclosure.

FIGS. 2 to 4 are views illustrating examples of methods 1-1) and 1-2) according to an embodiment of the present disclosure. As a specific example, it is assumed that the fragment counter field contained in the payload header is 8 bit, thus able to represent a total of 256 values. Here, FIG. 2 shows variations in the fragment counter value of the payload if one data unit is split into 256 fragments or less, and as each split fragment is contained in one payload, the same data unit is fragmented into 256 payloads or less.

FIG. 3 shows variations in the fragment counter value of the payload if one data unit is split into not less than 257 and not more than 512 fragments, and as each split fragment is contained in one payload, the same data unit is fragmented into not less than 257 and not more than 512 payloads. And, FIG. 4 shows variations in the fragment counter value of the payload if one data unit is split into not less than 513 and not more than 768 fragments, and as each split fragment is contained in one payload, the same data unit is fragmented into not less than 513 and not more than 768 payloads.

Referring to FIGS. 2 to 4, frag_counter means the fragment counter. And, f_i is the fragment indicator, and this is '00' if indicating one complete data unit, '01' if indicating the first fragment (start portion) among the fragments split from the same data unit, '10' if indicating any mid fragment except for the first and last fragments among the fragments split from the same data unit, and '11' if indicating the last fragment among the fragments split from the same data unit.

In the embodiment of method 1-2) described above, where the fragment indicator is '10' which indicates any mid fragment of the data unit, the fragment counter may be allowed to indicate that there is a payload containing another fragment among the fragments split from the same data unit. Accordingly, the fragment counter is supposed to have a number larger than 0. However, according to an embodiment of the present disclosure, the fragment counter value being "0" may indicate that the fragment counter is extended and reused (rolled over). Referring to FIG. 3, whereas the fragment indicator of the payload containing the 256th fragment of the data unit is 10, the fragment counter indicates '0.' According to an embodiment of the present disclosure, since the fragment counter being 0 means that the fragment counter is reused, i.e., it may indicate that it may be followed by the payloads (payloads corresponding to fragment counters b−1 to 0) containing the fragments subsequent to the 256th fragment of the data unit. Likewise, referring to FIG. 4, whereas the fragment indicators each corresponding to a respective one of the payload containing the 256th fragment of the data unit and the payload containing the 512th fragment are 10, the fragment counter indicates 0, denoting that the payloads containing the subsequent data packets follow.

In embodiment 1-3), in designating the fragment counter corresponding to embodiment 1-2) described above, according to an embodiment of the present disclosure, the transmit end may use the fragment counter values, corresponding to the first b payloads among the payloads containing the consecutive data unit fragments, starting from b−1, to zero, and may then use the subsequent X payloads, starting from X−1 to zero.

In the second method below, according to an embodiment of the present disclosure, where one data unit is split into a number of fragments equal to or larger than the maximum value of the fragment counter of the packet payload header, and each split fragment is contained in one data packet payload, there may further be configured information to indicate that the fragment counter is reused.

2. A method according to a second embodiment of the present disclosure is indicating that one data unit is split into a predetermined unit number of fragments or more and counting the payloads containing the split fragments in predetermined units (second method).

Specifically, it is assumed that as one data unit is split into a plurality of fragments, and each split fragment is contained in one payload, as many data packets as corresponds to the number of the split fragments for the data unit are produced. In other words, where the number of the payloads corresponding to the split fragments is larger than the maximum value of the fragment counter of the packet payload header, a roll-over indicator, as a separate packet payload header component, may be used to indicate that the number of the payloads is larger than the maximum value of the fragment counter. Simultaneously, the fragment counter may be extended for use, thereby able to express the number of the payloads subsequent to the current payload in the units of the maximum value of the fragment counter. According to an embodiment of the present disclosure, as the roll-over indicator, e.g., the fragment type and aggregation flag may be adopted. There is proposed as per embodiment 2-1) a method for separately indicating that the fragment counter is to be reused using the fragment type. It is assumed here that the existing fragment type is MFU (FT value is 2) for ease of description. In embodiment 2-1-1), it is assumed that one data unit is split into a smaller number of fragments than the 'maximum value' that may be expressed as the size of the fragment counter field of the packet payload header. In this case, as each of the fragments split from one data unit is contained in one payload, the number of the payloads containing the data unit fragments becomes smaller than the maximum value. Accordingly, according to an embodiment of the present disclosure, the fragment type indicates MFU, the fragment counter value of the payload header indicates the number of the payloads containing the remaining fragments coming after the reference fragment contained in the current payload, which contains one of the plurality of fragments split from the same data unit, and the fragment indicator of the last payload indicates that the fragment contained in the last payload is the last fragment among the plurality of fragments split from the same data unit and that the payload is the payload of the last data packet among the data packets of the same data unit.

In embodiment 2-1-2), it is assumed that one data unit is split into a larger number of fragments than the 'maximum value' that may be expressed as the size of the fragment counter field of the packet payload header. In this case, the number of the payloads containing the fragments split from the same data unit is larger than the number representable with the maximum value. Accordingly, according to an embodiment of the present disclosure, a new value for the fragment type may be designated to indicate that the fragment contained in the current payload has been split from the data unit which is split into a larger number of fragments than the 'maximum value' representable as the size of the fragment counter field of the current payload header. In embodiments 1-1), 1-2), and 1-3) described above, where the fragment indicator indicates a mid portion of the data unit, and the fragment counter is 0, it may be predicted that the current payload is followed by the payloads containing the remaining fragments subsequent to the reference fragment contained in the current payload among the plurality of fragments split from the same data unit. However, in embodiment 2-1-2) of the present disclosure, since the fragment counter can be predicted via the new value for the fragment type to be reused from if the first payload is received, the determination on the operation may be made in advance. For example, where each of X+b fragments as split from one data unit is contained in one payload under the context where the existing payload fragment type is MFU, and the maximum value of the fragment counter is X (where, b is a number equal or smaller than X), the corresponding payloads may be counted as per the following embodiments.

In embodiment 2-1-2-1), the fragment type of each payload may be denoted with a new value, e.g., 'Big MFU,' and the fragment counter values may be counted to be sequentially reduced by one, starting from X−1, to 0, for the first X payloads among the X+b consecutive payloads, like in embodiment 1-2). Thereafter, the fragment counter value for each of the subsequent b payloads may also be counted, starting from b−1, to be sequentially reduced by one to zero. In this case, thus, the fragment counter may indicate the number of the payloads containing the remaining fragments that follow the current payload, every X units for the fragments split from the same data unit.

As per embodiment 2-1-2-2), the fragment type of the first X payloads among the X+b consecutive payloads may be denoted with a new type, "Big MFU," and the fragment counter may count the fragments starting from X−1, to sequentially reduce by one to zero. Thereafter, the fragment type of the b payloads may be denoted with the existing type, "MFU," and the fragment counter may count the fragments starting from b−1 to sequentially reduce by one to zero.

Figure 5:
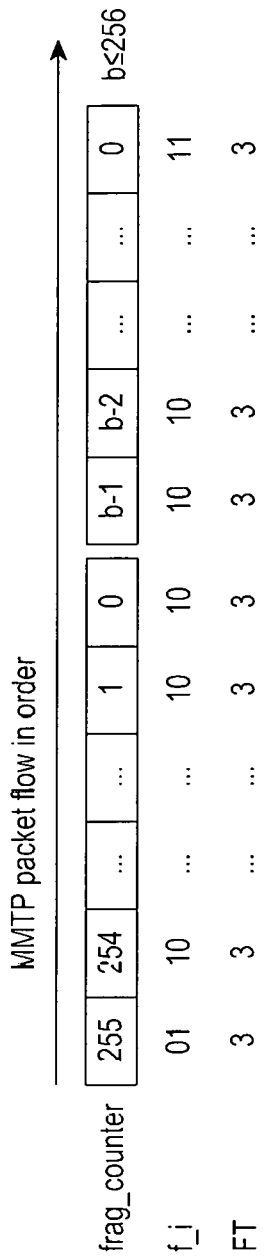
FIG. 5 is a view illustrating an example of a method for using a fragment counter and a fragment type if the fragment counter is reused according to an embodiment of the present disclosure.
Figure 6:
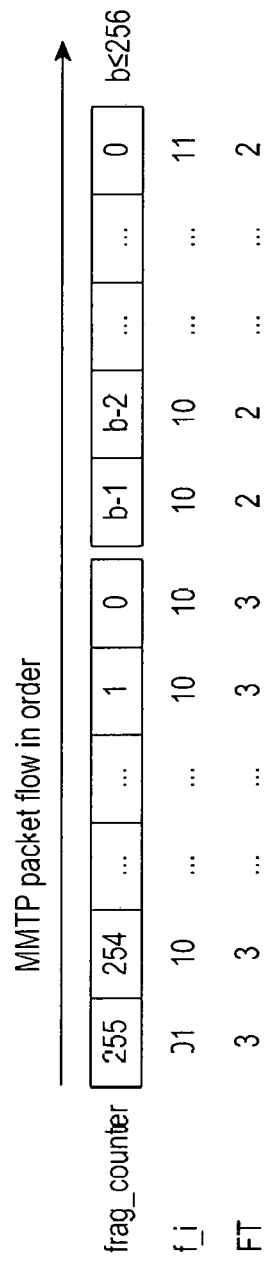
FIG. 6 is a view illustrating an example of another method for reusing a fragment counter according to an embodiment of the present disclosure.

FIGS. 5 and 6 are views illustrating specific examples of embodiments 2-1-2-1) and 2-1-2-2) in which it is assumed that the fragment counter field of the payload header is 8 bits, thus able to represent a total of 256 fragment counter values. Here, according to an embodiment of the present disclosure, FIG. 5 illustrates a method in which if one data unit is split into not less than 257 and not more than 512 fragments, and each split fragment is contained in one payload so that the same data unit is fragmented into not less than 257 and not more than 512 payloads, all of the payloads are designated with a new fragment type, Big MFU (the FT value is 3).

According to an embodiment of the present disclosure, FIGS. 6 and 7 illustrate an example of a method in which if the fragment counter is extended to be reused, only the payloads of if the fragment counter has been reused the last time are designated with the existing fragment type, MFU (the FT value is 2), and the rest is designated with a new fragment type, Big MFU (the FT value is 3). Here, Big MFU which is used to indicate the fragment type is provided as an example. The Big MFU may be replaced with other term, and this may be defined with a value for identifying that where one data unit is split into a larger number of fragments than the maximum value representable by the fragment counter and the other cases can be distinguished from each other. In other words, the Big MFU according to an embodiment of the present disclosure may indicate the case where the fragment counter with a limited size may be extended to be reused one or more times. Accordingly, although the FT value is set to 2 for MFU and 3 for Big MFU as an example, the FT value may be set to other values, without being limited thereto, as long as the values may distinguish between the two different types.

In embodiment 2-1-2-3), in designating the fragment counter to correspond to embodiments 2-1-2-1) and 2-1-2-2) described above, according to an another embodiment of the present disclosure, the fragment counter for the first b payloads among the X+b consecutive payloads may count the fragments starting from b−1 to sequentially reduce by one to zero. Thereafter, the X payloads may be counted starting from X−1 to sequentially reduce by one to zero.

In the second method as per embodiment 2-1-3), as another embodiment for a method for indicating that, as the data unit contained in the current payload in the fragment type is split into a larger number of fragments than the maximum value representable with the size of the fragment counter field of the header of the current payload, and each split fragment is contained in one payload, the data unit has been fragmented into a larger number of payloads than the maximum value, it is assumed that under the context where the fragment type of the current payload is MFU, and the maximum value countable by the fragment counter is X, one data unit is split into n*X+c (where, n is a natural number, and c is a number equal or smaller than X) fragments. In this case, similar to embodiments 2-1-2-1) and 2-1-2-2) described above, for the first X payloads among the n*X+c fragments split from the data unit, the fragment counter may count the fragments, starting from X−1 to sequentially reduce by one to zero, and for the subsequent payloads, the fragment counter may be reused to count the fragments starting from X−1, every X payloads, to sequentially reduce by one to zero. For the fragment type, similar to embodiment 2-1-2-2), if ever the fragment counter is reused, the fragment type is assigned with a new value, and only the c payloads corresponding to if it is reused the last time may be designated with the existing fragment type, MFU. FIG. 8 illustrates an example of embodiment 2-1-3), showing variations in the fragment type and the fragment counter value where as one data unit is split into not less than 513 and not more than 768 fragments, and each fragment is contained in one payload under the context where the fragment counter field of the payload header is 8 bits and is thus able to represent a total of 256 values, the data unit is fragmented into the payloads each corresponding to a respective one of the split fragments. If the existing fragment type is MFU (the FT value is 2), the 256 payloads that have first used the fragment counter are denoted with a new fragment type, Roll 2 MFU (the FT value is 4), the 256 payloads that have secondly reused the fragment counter are denoted with a new fragment type, Roll 1 MFU (the FT value is 3), and the remaining payloads are denoted with the existing fragment type, MFU (the FT value is 2). As such, where the new fragment type value is designated to, starting from the existing fragment type plus n, reduce by one if ever the fragment counter is reused, if the fragment indicator indicates a mid portion, '10,' of the data unit, and the fragment counter value is 0, how many times the fragment counter are to be further reused from then on may be calculated back from the fragment type value. Referring to FIG. 8, where the total number of the payloads is 2*256+c, if the fragment type values 4(=2+2), 3, and 2 are sequentially used, the RX end may be aware how many times the fragment counter is to be further reused from then on if ever the fragment counter becomes zero, and where the fragment counter is reused, it may previously be aware that a maximum of 256 payloads remain. Also in this case, the fragment type denotation or value may be replaced with any other denotation or value that may differentiate if the fragment counter is reused. As per another embodiment, in designating the fragment counter as per method 2-1-3) described above, the fragment counter for the first c fragments among the n*X+c consecutive payloads may count the fragments starting from c−1 to reduce by one to zero. Counting to zero starting from X−1 may be repeated on the subsequent n*X payloads.

There is proposed as per another embodiment 2-2-1) a method for separately indicating that the fragment counter is to be reused using the aggregation flag. Here, the existing aggregation flag indicates that one payload contains a plurality of data units. On the other hand, it is assumed that one data unit is split into a smaller number of fragments than the maximum value representable with the size of the fragment counter field of the packet payload header, with each fragment contained in one payload, and is fragmented into the payloads corresponding to the fragments of the data unit. In this case, according to an embodiment of the present disclosure, the aggregation flag indicates that one data unit is contained, (A is 0), the fragment counter value of the payload header indicates the number of payloads containing the remaining fragments that are to be followed by the current payload among the fragments split from the same data unit, and the fragment indicator of the last payload among the payloads indicates the last fragment corresponding to the last data packet of the same data unit.

As per embodiment 2-2-2), where one data unit is split into a larger number of fragments than the maximum value representable with the size of the fragment counter field of the packet payload header, with each fragment contained in one payload, and is fragmented into the payloads corresponding to the split fragments, the aggregation flag value may be designated with '1,' indicating that the data unit contained in the current payload is split into a larger number of fragments than the maximum value representable with the size of the fragment counter field of the current payload header and is fragmented into the payloads corresponding to the split fragments. In embodiment 2-2-2), the fragment indicator is not 00 but a different value, i.e., 10, thus meaning that all of the payloads containing the fragments of the same data unit have not been received yet. Thus, although the aggregation flag value should be 0, the aggregation flag is exceptionally set to 1, allowing the reuse of the fragment counter to be predicted. Like in embodiment 2-1) described above, if the fragment indicator indicates a mid portion of the data unit and the occasion where the fragment counter becomes 0 occurs in methods 1-1), 1-2), and 1-3), the payloads containing the remaining fragments subsequent to the current payload among the fragments of the data unit may be predicted to be consecutively received until the number of the payloads received reaches the maximum value of the fragment counter. Conversely, in embodiment 2-2-2), since it can be predicted via the aggregation flag that the fragment counter is to be reused from if the payload containing the first fragment is received among the fragments split from the data unit, a determination on the operation may be made in advance. For example, where, under the context where the maximum value countable by the fragment counter is X, one data unit is split into X+b fragments, with each fragment contained in one payload, and is fragmented into the payloads corresponding to a total of X+b fragments (where, b is a number equal or smaller than X), the number of the payloads may be counted as per the following embodiments. First, as per embodiment 2-2-2-1), the aggregation flag of each payload is designated with 1, the fragment counter, similar to method 1-2), counts the fragments, starting from X−1 to sequentially reduce by one to zero, for the first X payloads among the X+b consecutive payloads, and then counts the fragments, starting from b−1 to sequentially reduce by one to zero for the subsequent b payloads. In this case, thus, the fragment counter may indicate, based on the current payload, the number of the payloads containing the remaining fragments that are to be received after the fragment contained in the current payload, every X units for the payloads containing the fragments split from the same data unit.

As per another embodiment 2-2-2-2), the aggregation flag for the first X payloads among the consecutive payloads containing the X+b fragments split from the same data unit is designated with 1, and the fragment counter value of the X payloads counts, starting from X−1, t sequentially reduce by one to zero. For the fragment counter value of the subsequent b payloads, the aggregation flag is designated with 0, and the fragment counter counts, starting from b−1, to sequentially reduce by one to zero.

Figure 9:
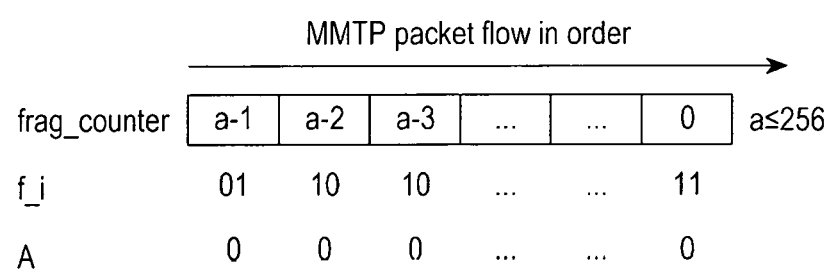
FIG. 9 is a view illustrating an example of indicating to reuse a fragment counter using an aggregation flag (or an aggregation indicator) according to an embodiment of the present disclosure.
Figure 10:
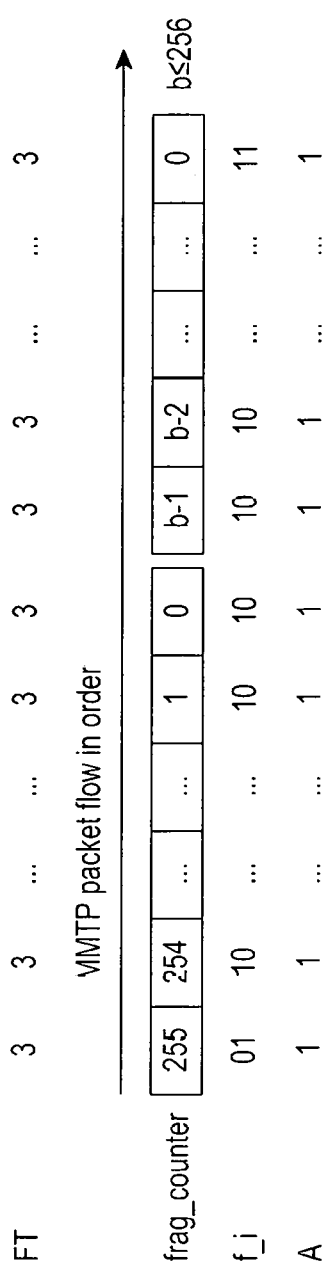
FIG. 10 is a view illustrating another example of indicating to reuse a fragment counter using an aggregation flag (or an aggregation indicator) according to an embodiment of the present disclosure.
Figure 11:
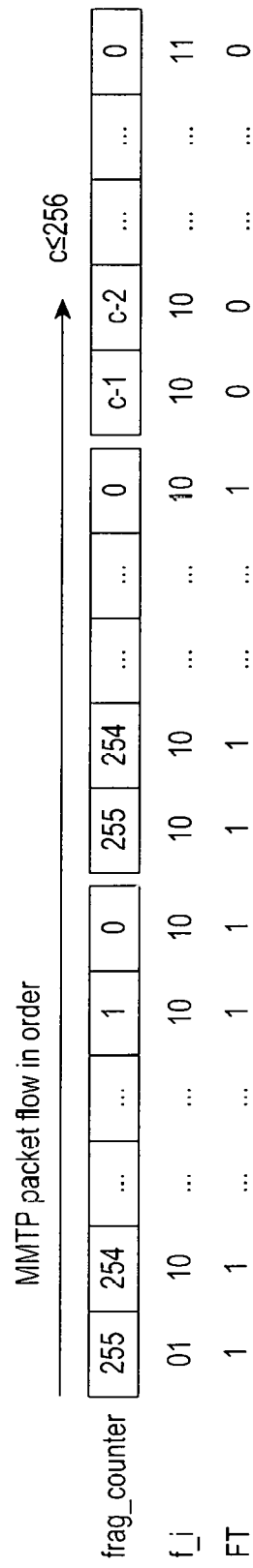
FIG. 11 is a view illustrating another example of indicating to reuse a fragment counter using an aggregation flag (or an aggregation indicator) according to an embodiment of the present disclosure.

FIGS. 9 to 11 illustrate examples of embodiments 2-2-1) and 2-2-2-2) described above. It is assumed here that the fragment counter field of the payload header is 8 bits, thus able to represent a total of 256 values, for ease of description. In this case, according to an embodiment of the present disclosure, FIG. 9 illustrates an example in which one data unit is split into not more than 256 fragments, with each fragment contained in one payload, and is fragmented into the payloads corresponding to the split fragments. According to an embodiment of the present disclosure, FIG. 10 illustrates an example of a method for designating the aggregation flag for all the payloads with 1, where one data unit is split into not less than 257 and not more than 512 fragments, with each fragment contained in one payload, and is fragmented into the payloads corresponding to the split fragments. According to an embodiment of the present disclosure, FIG. 11 illustrates an example of a method in which, where the fragment counter is extended for reuse, the aggregation flag is designated with 0 for only the payloads for the last time that the fragment counter has been reuse and is designated with 1 for the rest.

Figure 12:
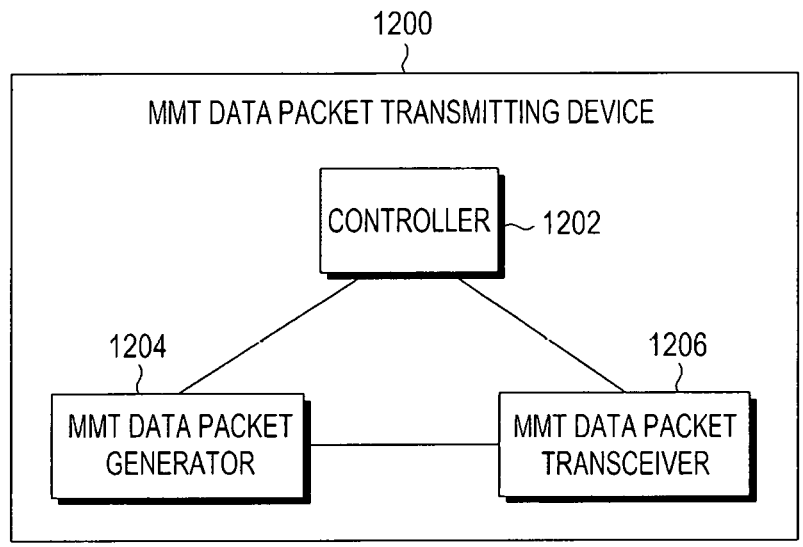
FIG. 12 is a view illustrating an apparatus configuration of a transmit end according to an embodiment of the present disclosure.

FIG. 12 is a view illustrating a configuration of a transmit end according to an embodiment of the present disclosure.

Referring to FIG. 12, an MMT data packet transmitting device 1200 includes, e.g., an MMT data packet generator 1204 to generate an MMT data packet corresponding to a configuration of an MMT data packet as described above as per embodiments (A) and (B), a controller 1202 to control the operation of transmitting the MMT data packet by an MMT data packet transceiver 1206 and the operation of generating the MMT data packet by the MMT data packet generator 1204, considering the characteristics of the multimedia data and the network environment, and the MMT data packet transceiver 1206 to transmit the generated MMT data packet. The controller 1202 may be configured to generate fragmentation information about the data unit to be transmitted in the form of the MMT data packet and include it in the packet payload header, as the data unit is split into a plurality of fragments and each fragment is contained in the payload of the MMT data packet. The fragmentation information has been described above, and no detailed description thereof is given here.

According to an embodiment of the present disclosure, the controller 1202 may set the fragment counter value of the corresponding payload according to the above-described embodiments based on whether one data unit has been split into a smaller number of fragments than the maximum value of the fragment counter field contained in the packet payload header, configure the MMT data packet by including the fragmentation information containing information indicating the methods of setting the fragment counter value and the set fragment counter value, and control the MMT data packet transceiver 1206 to transmit the MMT data packet to the transmit end.

Figure 13:
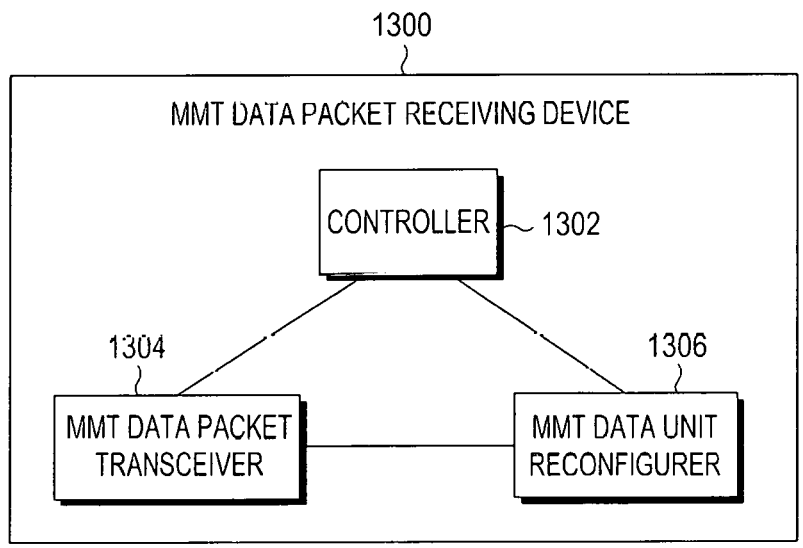
FIG. 13 is a view illustrating an apparatus configuration of a receive end according to an embodiment of the present disclosure.

FIG. 13 is a view illustrating a configuration of a receive end according to an embodiment of the present disclosure.

Referring to FIG. 13, according to an embodiment of the present disclosure, an MMT data packet receiving device 1300 may include, e.g., an MMT data packet transceiver 1304 to receive an MMT data packet configured corresponding to the MMT data packet configuration method (B) described above, a controller 1302 to control the operation of reconfiguring the MMT data unit by an MMT data unit reconfigurer 1306 and the operation of receiving by the MMT data packet transceiver 1304, considering the characteristics of the multimedia data and network environment, and the MMT data unit reconfigurer 1306 to reconfigure the same MMT data unit based on the fragments obtained from the payload of the received MMT data packet.

Specifically, according to an embodiment of the present disclosure, the operations of the MMT data packet transmitting device 1200 and their corresponding operations of the MMT data packet receiving device 1300 are described.

An example of an embodiment of the present disclosure regards a first scheme that does not indicate whether the fragment counter value is reused. In this case, it is assumed that one data unit is split into several fragments, with each split fragment contained in one payload, configuring a plurality of data packets. At this time, where one data unit is split into a smaller number, e.g., a, of fragments than the maximum value, e.g., X, representable with the size of the fragment counter field of the packet payload header, if it is fragmented into the payloads each corresponding to a respective one of the a fragments, the fragment counter value of each payload may be set to sequentially reduce by one from a−1 to 0. As another example, where one data unit is split into the payloads corresponding to n*X+c (which is larger than the maximum value X) fragments (where c is a positive integer equal or smaller than X), the fragment counter value of each payload may be set to be reused (n−1) times to, starting from X−1, sequentially reduce by one to zero for the X consecutive payloads among the n*X+c consecutive payloads, and the fragment counter value of the last c payloads may be set to, starting from c−1, sequentially reduce by one to zero. At this time, the fragment indicator of each payload is denoted '01' where the corresponding payload contains the first fragment of the data unit, '10' where the payload contains any mid fragment except for the first and last fragments among the fragments of the data unit, and '11' where the payload contains the last fragment of the data unit.

Figure 14:
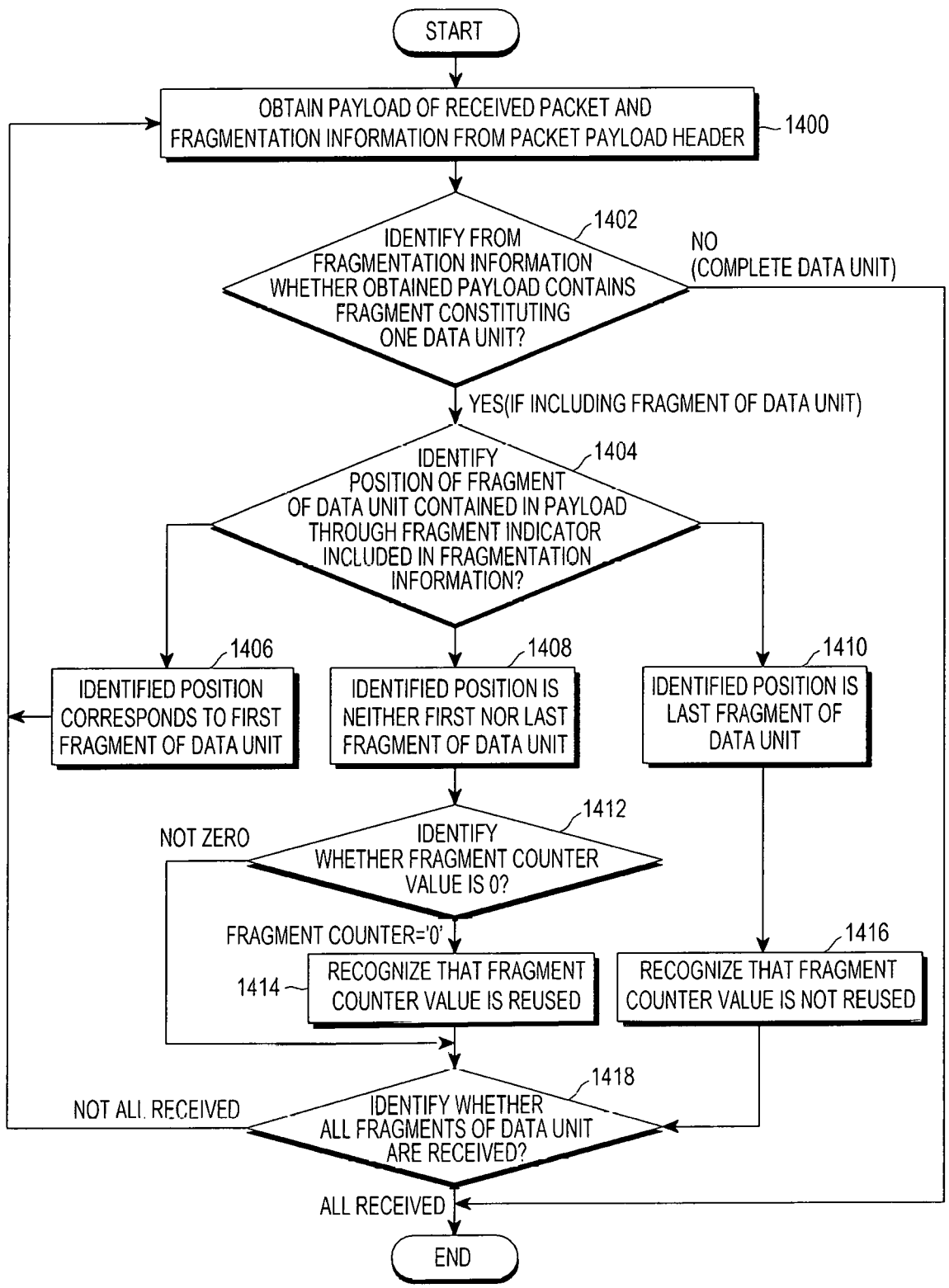
FIG. 14 is a flowchart illustrating an example of operation flow chart by a receive end according to an embodiment of the present disclosure.

FIG. 14 is a flowchart illustrating an example of operations by a receive end according to an embodiment of the present disclosure. Here, according to an embodiment of the present disclosure, it is assumed that there is set no indicator as to whether to reuse the fragment counter.

Referring to FIG. 14, in step 1400, the MMT data packet receiving device 1300 receives the MMT data packet from the transmit end. The MMT data packet receiving device 1300 obtains the fragmentation information from the packet payload header constituting the MMT data packet and the data packet from the packet payload. In step 1402, the MMT data packet receiving, device 1300 obtains the fragment indicator from the fragmentation information and identifies whether the payload contains fragments split from one data unit based on the obtained fragment indicator value. As described above, the fragment indicator indicating '00' denotes that the payload contains the complete data unit, and the fragment indicator indicating a value other than '00' denotes that the payload contains fragments split from the data unit.

Where, as a result of the identification, the payload contains the complete data unit, the MMT data packet receiving device 1300 terminates the operation.

Where, as a result of the identification, the payload contains fragments split from the data unit, it goes to step 1404. In step 1404, the MMT data packet receiving device 1300 identifies the position of the fragment of the data unit contained in the payload through the fragment indicator contained in the fragmentation information.

Where, as a result of the identification, it indicates the first fragment among the fragments split from the data unit in step 1406, the MMT data packet receiving device 1300 goes back to step 1400, waiting to receive the next data unit fragment.

Where, as a result of the identification, it is neither the first fragment nor the last fragment among the fragments split from the data unit in step 1408, the MMT data packet receiving device 1300 proceeds with step 1412. In step 1412, the MMT data packet receiving device 1300 identifies whether the fragment counter value is 0. Where, as a result of the identification, it is set to 0, the MMT data packet receiving device 1300 may recognize that the fragment counter value has been reused in step 1414 according to an embodiment of the present disclosure. In other words, according to an embodiment of the present disclosure, the MMT data packet receiving device 1300, although the received packet payload header have no separate information as to whether the fragment counter value has been reused, may recognize that the fragment counter value has been reused where the fragment indicator indicates that the position of the fragment contained in the payload is neither the first nor last fragment while the fragment counter value is 0.

Where, as a result of the identification, it is not 0, the MMT data packet receiving device 1300 goes to step 1418, identifying whether all the data packets containing the fragments split from the data unit have been received. Where, as a result of the identification, all the data packets have been received, the operation is terminated. Unless, as a result of the identification, all the data packets have been received, the MMT data packet receiving device 1300 goes back to step 1400, waiting to receive the data packet containing the next fragment.

Where, as a result of the identification in step 1404, the fragment is the last fragment of the data unit in step 1410, the MMT data packet receiving device 1300 goes to step 1416, recognizing that the fragment counter value has not been reused.

Although in the embodiment of FIG. 14 the MMT data packet receiving device 1300 identifies the position of the fragment contained in the payload through the fragment indicator and then identifies the fragment counter for ease of description, the sequential flow of the operations does not influence the operation of the MMT data packet receiving device 1300 determining whether the fragment counter is reused. Accordingly, according to another embodiment, the operations may be performed in a different order. In other words, the embodiment of FIG. 14 should be appreciated as an example for describing an embodiment in which the fragment counter is recognized as being reused upon meeting both the conditions, i.e., the one where the fragment contained in the payload received by the MMT data packet receiving device 1300 is neither the first nor last fragment of the data unit, and the other where the fragment indicator counter 0.

According to another embodiment of the present disclosure, it is assumed that, where one data unit is split into multiple fragments, the number of the split fragments is a which is smaller than the maximum value, e.g., X, representable with the site of the fragment counter field of the packet payload header, and each fragment is contained in one payload. In this case, the fragment counter value of each payload counts to sequentially reduce by one from a−1 to zero. In this case, the fragment type of each payload indicates MFU. If one data unit is split into a larger number, i.e., n*X+c, of fragments than the maximum value, with each fragment contained in one payload (where, c is a positive integer equal or smaller than X), the fragment counter of each payload counts the value, starting from X−1, to sequentially reduce by 1 to zero for the first X consecutive payloads among the n*X+c consecutive payloads, allowing it to be reused (n−1) times in total, and counts the value, starting from c−1, to sequentially reduce by one to zero, for the last c payloads. At this time, according to another embodiment of the present disclosure, the indicator as to whether to reuse the fragment counter of each payload may be set to 'reuse.' The fragment indicator of each payload is set to '01' where the corresponding payload contains the first fragment of the same data unit, '10' where the payload contains any mid fragment except for the first and last fragments of the same data unit, and '11' where the payload contains the last fragment of the same data unit. According to an embodiment, the indicator as to whether to reuse the fragment counter may be set to a particular fragment counter value, indicating whether to reuse the fragment counter.

Figure 15:
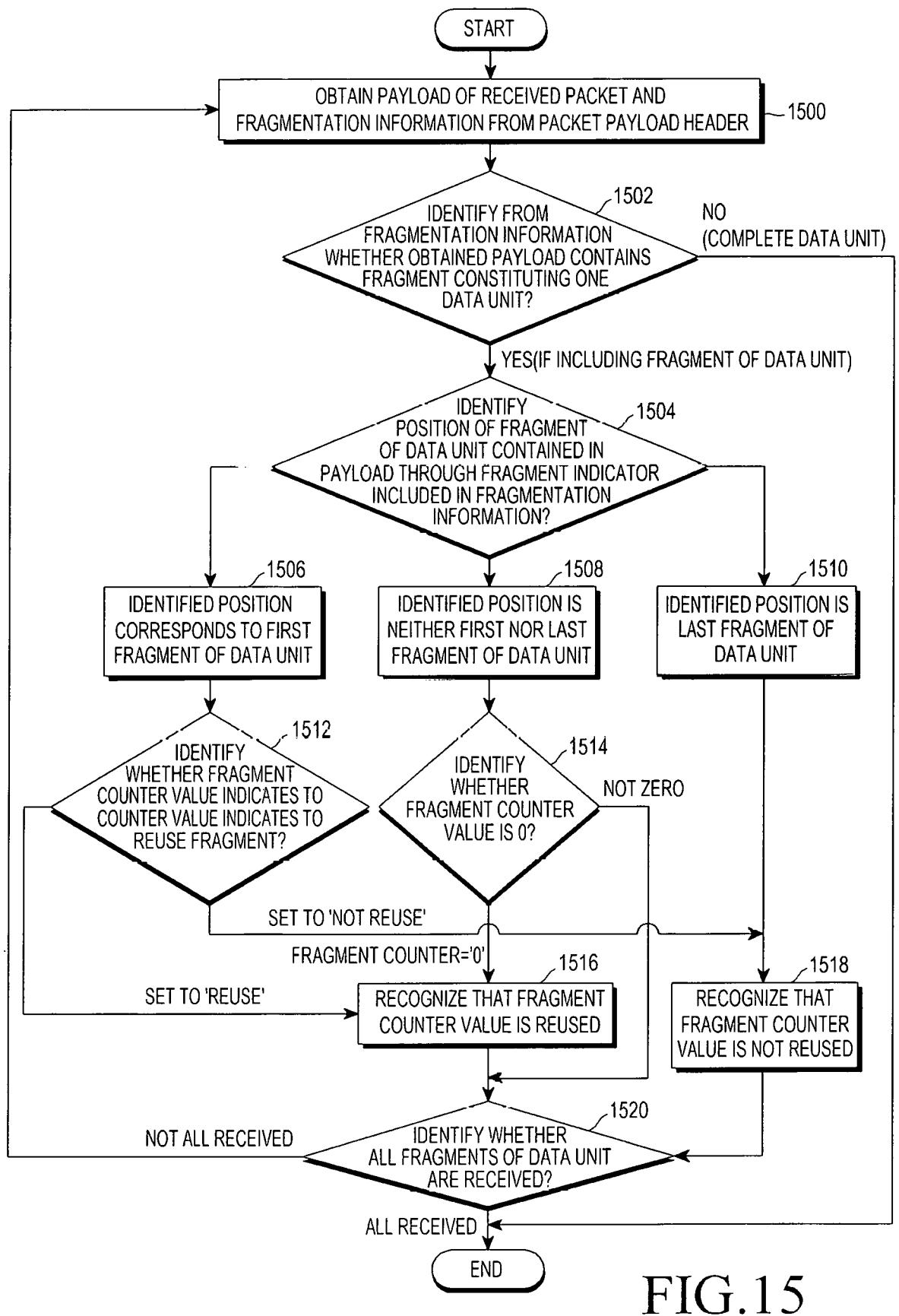
FIG. 15 is a flowchart illustrating another example of operation flow chart by a receive end according to an embodiment of the present disclosure.

FIG. 15 is a flowchart illustrating another example of operations by a receive end according to an embodiment of the present disclosure. According to an embodiment, it is assumed here that the indicator as to whether to reuse the fragment counter is set to a particular fragment counter value, indicating whether to reuse the fragment counter.

Referring to FIG. 15, in steps 1500 to 1504, the MMT data packet receiving device 1300 performs the same operations as those in steps 1400 to 1404 of FIG. 14, and no detailed description thereof is given.

In step 1506, where, as a result of the identification, the obtained payload contains the first fragment of the data unit, the MMT data packet receiving device 1300 identifies whether the fragment counter value is set to a particular value to indicate whether to reuse the fragment counter in step 1512 according to an embodiment of the present disclosure. Where, as a result of the identification, it is not set to the particular value, the MMT data packet receiving device 1300 goes to step 1518, recognizing that the fragment counter value is not reused. Where, as a result of the identification, it is set to the particular value, the MMT data packet receiving device 1300 goes to step 1516, recognizing that the fragment counter value is reused.

Where, as a result of the identification, the obtained payload contains a fragment which is neither the first nor last fragment of the data unit in step 1508, the MMT data packet receiving device 1300 goes to step 1514. In step 1514, the MMT data packet receiving device 1300 identifies whether the fragment counter value is 0. Where, as a result of the identification, it is set to 0, the MMT data packet receiving device 1300 may recognize that the fragment counter value is reused in step 1516. Also in this case, according to an embodiment of the present disclosure, the MMT data packet receiving device 1300, although there is no separate setting on whether the fragment counter is reused, may recognize that the fragment counter value is reused where the position indicated by the fragment indicator is neither the first nor last fragment of the data unit while the fragment counter value is 0.

Where, as a result of the identification in step 1514, the fragment counter value is not 0, the MMT data packet receiving device 1300 goes to step 1520, identifying whether all the fragments split from the data unit have been received, and if all the fragments are identified to have been received, terminates the operation. Unless, as a result of the identification, all the fragments have been received, the MMT data packet receiving device 1300 goes back to step 1500, waiting to receive the next fragment of the data unit.

Where, as a result of the identification, the obtained payload contains the last fragment of the data unit in step 1510, the MMT data packet receiving device 1300 goes to step 1518, recognizing that the fragment counter value is not reused, and goes to step 1520.

According to another embodiment of the present disclosure, where one data unit is split into multiple fragments, the number of the split fragments is a which is smaller than the maximum value, e.g., X, representable with the size of the fragment counter field of the packet payload header, and each fragment is contained in one payload, the fragment counter value of each payload counts to sequentially reduce by one from a−1 to zero. The fragment type of each payload indicates MFU. As another example, if one data unit is split into a larger number, i.e., n*X+c, of fragments than the maximum value, X, with each fragment contained in one payload (where, c is a positive integer equal or smaller than X), the fragment counter of each payload counts the value, starting from X−1, to sequentially reduce by 1 to zero for the first X consecutive payloads among the n*X+c consecutive payloads, allowing it to be reused (n−1) times in total, and counts the value, starting from c−1, to sequentially reduce by one to zero, for the last c payloads. Here, according to another embodiment of the present disclosure, the aggregation flag (or aggregation indicator) of each payload is set to indicate whether to reuse the fragment counter. Specifically, the aggregation flag of each payload sets the indicator as to whether to reuse the counter to 'reuse' for the first n*X consecutive payloads among the n*X+c consecutive payloads and sets the indicator as to whether to reuse the counter to 'not reuse' for the last c payloads. The fragment indicator of each payload is set to '01' where the corresponding payload contains the first fragment among the fragments split from the data unit, '10' where the payload contains any mid fragment except for the first and last fragments of the data unit, and '11' where the payload contains the last fragment of the data unit.

According to another embodiment of the present disclosure, where one data unit is split into multiple fragments, and the number of the split fragments is a which is smaller than the maximum value, e.g., X, representable with the size of the fragment counter field of the packet payload header, the fragment counter of each payload counts to sequentially reduce by one from a−1 to zero. The fragment type of each payload indicates MFU. As per another embodiment, where one data unit is split into a larger number, i.e., n*X+c, of fragments than the maximum value, X, with each split fragment contained in one payload (where, c is a positive integer equal or smaller than X), the fragment counter of each payload counts the value, starting from X−1, to sequentially reduce by 1 to zero for the first X consecutive payloads among the n*X+c consecutive payloads, allowing it to be reused (n−1) times in total, and counts the value, starting from c−1, to sequentially reduce by one to zero, for the last c payloads. According to an embodiment of the present disclosure, the fragment type may be used to indicate whether to reuse the fragment counter. As a specific example, the fragment type of each payload may be denoted with Big MFU, indicating whether to reuse the fragment counter. Also in this case, the fragment indicator of each payload is denoted '01' where the corresponding payload contains the first fragment of the data unit, '10' where the payload contains a fragment other than the first and last fragments of the data unit, and '11' where the payload contains the last fragment of the data unit.

According to another embodiment of the present disclosure, it is assumed that one data unit is split into multiple fragments, and the number of the split fragments is a which is smaller than the maximum value, e.g., X, representable with the size of the fragment counter field of the packet payload header. At this time, each split fragment is contained in one payload, and the fragment counter of each payload counts to sequentially reduce by one from a−1 to 0. The fragment type of each payload indicates MFU. As per another embodiment, where one data unit is split into a larger number, i.e., n*X+c, of fragments than the maximum value, X, with each split fragment contained in one payload (where, c is a positive integer equal or smaller than X), the fragment counter value of each payload counts the value, starting from X−1, to sequentially reduce by 1 to zero for the first X consecutive payloads among the n*X+c consecutive payloads, allowing it to be reused (n−1) times in total, and counts the value, starting from c−1, to sequentially reduce by one to zero, for the last c payloads. The fragment type of each payload is denoted with "Big MFU" for the first n*X consecutive payloads among the n*X+c consecutive payloads and is denoted with MFU for the last c payloads. The fragment indicator of each payload is denoted '01' where the corresponding payload contains the first fragment among the fragments split from the data unit, '10' where the payload contains a fragment other than the first and last fragments among the fragments, and '11' where the payload contains the last fragment of the data unit.

Figure 16:
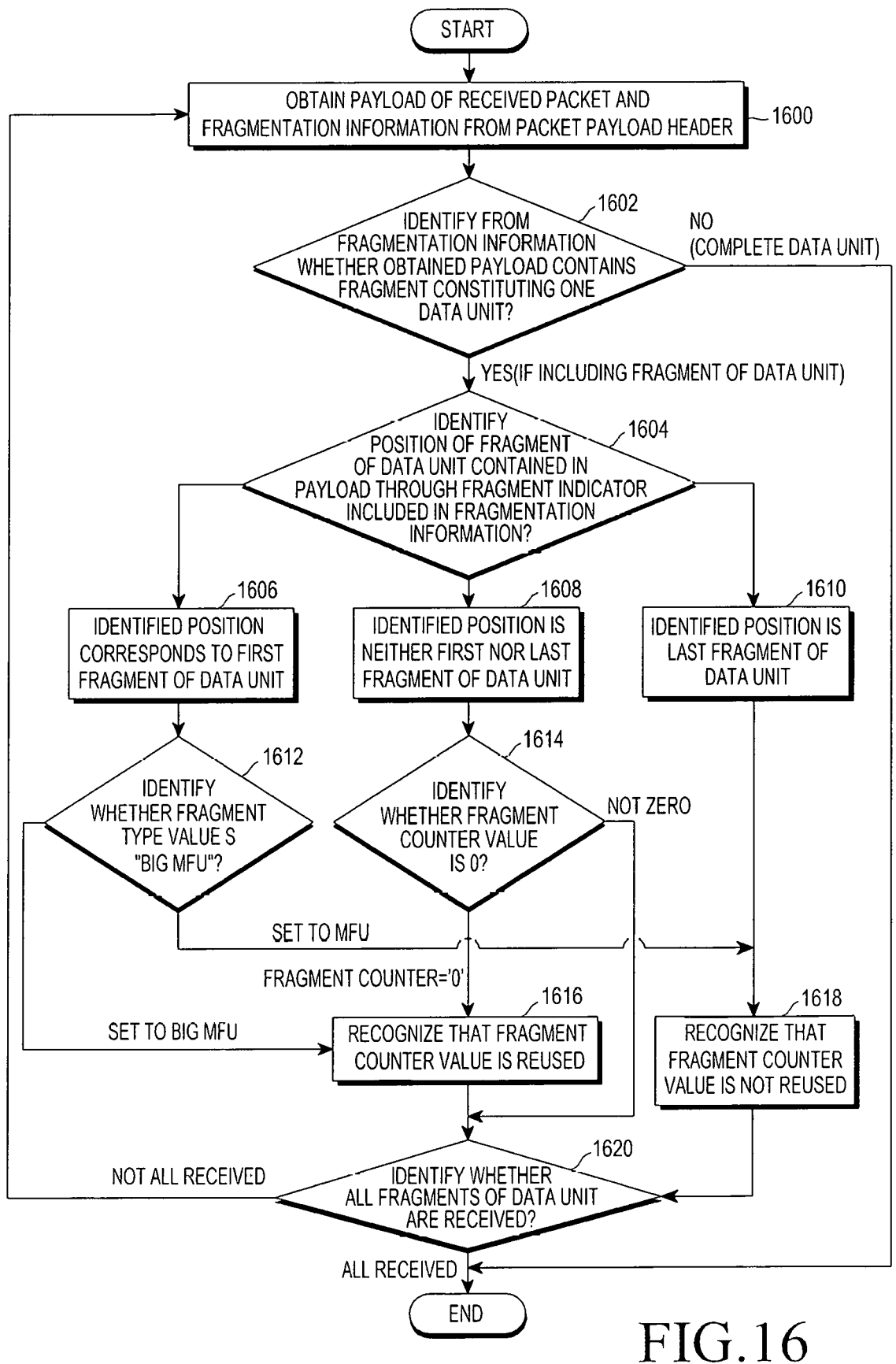
FIG. 16 is a flowchart illustrating another example of operation flow chart by a receive end according to an embodiment of the present disclosure.

FIG. 16 is a flowchart illustrating another example of operations by a receive end according to an embodiment of the present disclosure. In the embodiment of FIG. 16, it is assumed that whether to reuse the fragment counter is indicated using the fragment type value. As an example, it is assumed that the fragment type being set to "fig MPU" indicates to reuse the fragment counter.

Referring to FIG. 16, in steps 1600 to 1604, the MMT data packet receiving device 1300 performs the same operations as those in steps 1400 to 1404 of FIG. 14, and no detailed description thereof is given.

If, as a result of the identification in step 1604, the result of the identification indicates that the payload contains the first fragment among the fragments split from the data unit in step 1606, the MMT data packet receiving device 1300, in step 1612, identifies whether the fragment type value for the payload is set to a particular value, e.g., "Big MFU," to indicate whether to reuse the fragment counter. Where, as a result of the identification, it is not set to "Big MFU," the MMT data packet receiving device 1300 goes to step 1618, recognizing that the fragment counter value is not reused. Where, as a result of the identification, it is set to the particular value, the MMT data packet receiving device 1300 goes to step 1616, recognizing that the fragment counter value is reused.

Where, as a result of the identification, the fragment contained in the payload is neither the first nor last fragment of the data unit in step 1608, the MMT data packet receiving device 1300 goes to step 1614. In step 1614, the MMT data packet receiving device 1300 identifies whether the fragment counter value for the payload is 0. Where, as a result of the identification, it is set to 0, the MMT data packet receiving device 1300 may recognize that the fragment counter value is reused in step 1616. Also in this case, according to an embodiment of the present disclosure, the MMT data packet receiving device 1300, although there is no separate setting on whether the fragment counter is reused, may recognize that the fragment counter value is reused where the fragment indicator indicates that the payload contains a fragment other than the first and last fragments of the data unit while the fragment counter value is 0.

Where, as a result of the identification, the fragment counter value is not 0, the MMT data packet receiving device 1300 goes to step 1620, identifying whether all the fragments split from the data unit have been received, and if all the fragments are identified to have been received, terminates the operation. Unless, as a result of the identification, all the data packets have been received, the MMT data packet receiving device 1300 goes back to step 1600, waiting to receive the data packet constituted of the payload containing the next fragment.

Where, as a result of the identification, the payload contains the last fragment of the data unit in step 1610, the MMT data packet receiving device 1300 goes to step 1618, recognizing that the fragment counter value is not reused, and goes to step 1620.

According to another embodiment of the present disclosure, it is assumed that one data unit is split into multiple fragments, and the number of the split fragments is a which is smaller than the maximum value, e.g., X, representable with the size of the fragment counter field of the packet payload header. At this time, each fragment is contained in one payload, and the fragment counter value of each payload is counted to sequentially reduce by one from a−1 to 0. At this time, the fragment type of each payload indicates MFU. As another example, if one data unit is split into a larger number, i.e., n*X+c, of fragments than the maximum value, X, with each fragment contained in one payload (where, c is a positive integer equal or smaller than X), the fragment counter value of each payload is counted, starting from X−1, to sequentially reduce by 1 to zero for the first X consecutive payloads among the n*X+c consecutive payloads, allowing it to be reused (n−1) times in total, and is counted, starting from c−1, to sequentially reduce by one to zero, for the last c payloads. For the fragment type of each payload, the fragment type value for the first X consecutive payloads among the n*X+c consecutive payloads is set to n+FT and is then sequentially reduced by one every X units to 1+FT, and then, the fragment type value for the last c payloads is denoted with FT. Likewise, the fragment indicator of each payload is denoted '01' where the corresponding payload contains the first fragment among the fragments split from the data unit, '10' where the fragment contained in the payload is neither the first nor last fragment of the data unit, and '11' where the payload contains the last fragment.

Figure 17:
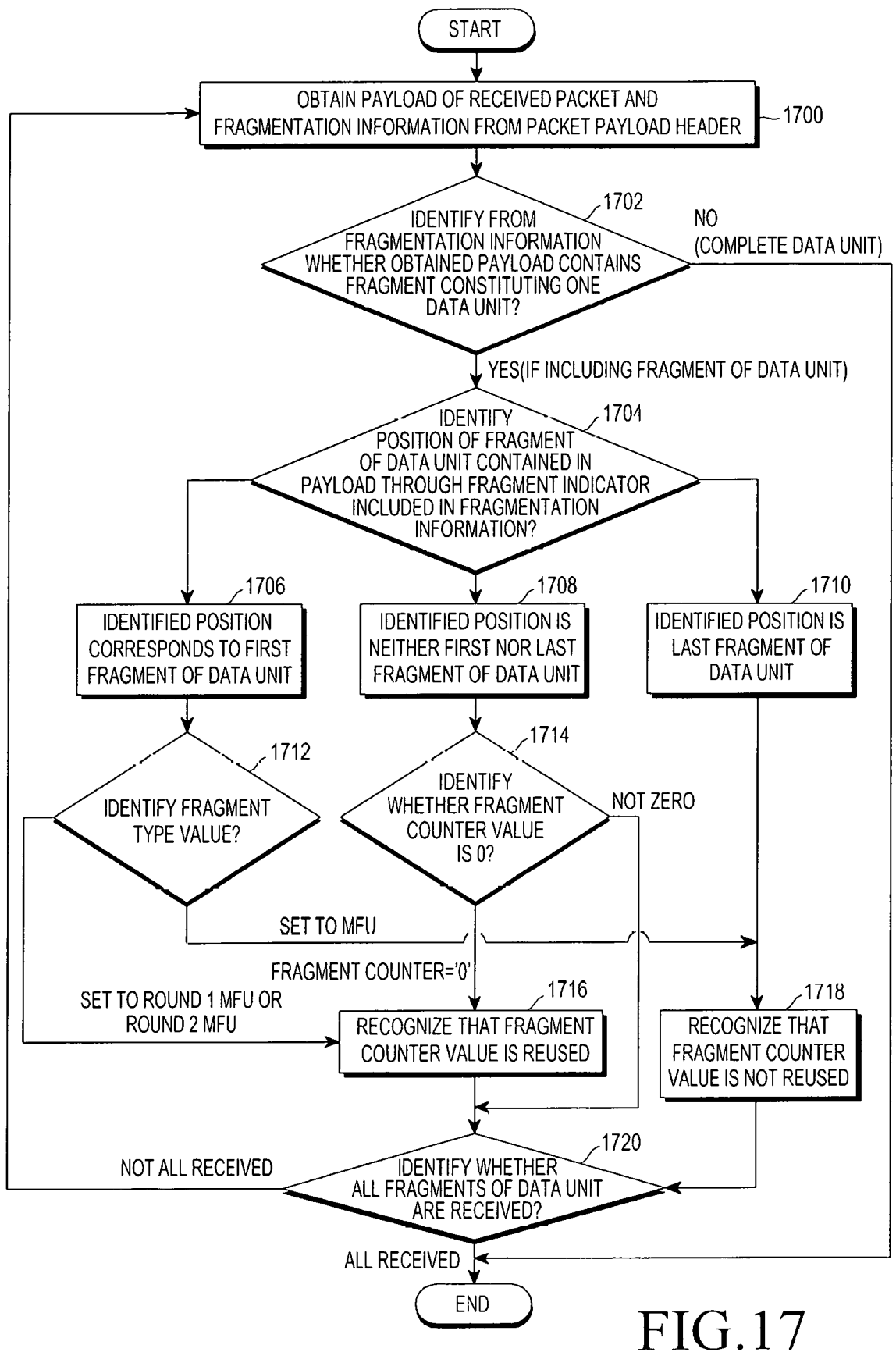
FIG. 17 is a flowchart illustrating another example of operation flow chart by a receive end according to an embodiment of the present disclosure.

FIG. 17 is a flowchart illustrating another example of operations by a receive end according to an embodiment of the present disclosure. In the embodiment of FIG. 17, it is assumed that whether to reuse the fragment counter is indicated by marking the fragment type value with the number of times of the repetition of the fragment counter, e.g., by setting "round 1 MFU," or "round 2 MFU."

Referring to FIG. 17, in steps 1700 to 1704, the MMT data packet receiving device 1300 performs the same operations as those in steps 1400 to 1404 of FIG. 14, and no detailed description thereof is given.

If, as a result of the identification in step 1704, the obtained payload contains the first fragment among the fragments split from the data unit in step 1706, the MMT data packet receiving device 1300 identifies whether the fragment type value is set to a particular value to indicate whether to reuse the fragment counter. Where, as a result of the identification, it is set to "MFU," the MMT data packet receiving device 1300 goes to step 1718, recognizing that the fragment counter value is not reused. Where, as a result of the identification, it is set to the particular value, i.e., round 1 MFU or round 2 MFU, the MMT data packet receiving device 1300 goes to step 1716, recognizing that the fragment counter value is reused.

Where, as a result of the identification, the fragment contained in the payload is neither the first nor last fragment of the data unit in step 1708, the MMT data packet receiving device 1300 goes to step 1714. In step 1714, the MMT data packet receiving device 1300 identifies whether the fragment counter value is 0. Where, as a result of the identification, it is set to 0, the MMT data packet receiving device 1300 may recognize that the fragment counter value is reused in step 1716. Also in this case, according to an embodiment of the present disclosure, the MMT data packet receiving device 1300, although there is no separate setting on whether the fragment counter is reused, may recognize that the fragment counter value is reused where the fragment indicator indicates that the fragment contained in the payload is neither the first nor last fragment of the data unit while the fragment counter value is 0.

Where, as a result of the identification, the fragment counter value is not 0, the MMT data packet receiving device 1300 goes to step 1720, identifying whether all the fragments split from the data unit have been received, and if all the data packets are identified to have been received, terminates the operation. Unless, as a result of the identification, all the fragments have been received, the MMT data packet receiving device 1300 goes back to step 1700, waiting to receive the data packet constituted of the payload containing the next fragment.

Where the fragment contained in the payload is the last fragment of the data unit in step 1710, the MMT data packet receiving device 1300 goes to step 1718, recognizing that the fragment counter value is not reused, and goes to step 1720.

According to another embodiment of the present disclosure, where one data unit is split into multiple fragments, and the number of the split fragments is a which is smaller than the maximum value, e.g., X, representable with the size of the fragment counter field of the packet payload header, each fragment is contained in one payload, and the fragment counter value of each payload is counted, starting from a−1, to sequentially reduce by one to zero. At this time, the fragment type of each payload is set to indicate MFU. As another example, where one data unit is split into a larger number, i.e., n*X+c, of fragments than the maximum value, X, (where, c is a positive integer equal or smaller than X), each split fragment is contained in one payload, and the fragment counter value of each payload is counted, starting from X−1, to sequentially reduce by 1 to zero for the first X consecutive payloads among the n*X+c consecutive payloads, allowing it to be reused (n−1) times in total, and is counted, starting from c−1, to sequentially reduce by one to zero, for the last c payloads. According to another embodiment of the present disclosure, the aggregation flag (or aggregation indicator) of each payload is set to a particular value, e.g., 1, to indicate to reuse the fragment counter. Here, the fragment indicator of each payload is denoted '01' where the corresponding payload contains the first fragment among the fragments split from the data unit, '10' where the fragment contained in the payload is neither the first nor last fragment of the data unit, and '11' where the payload contains the last fragment of the data unit.

Figure 18:
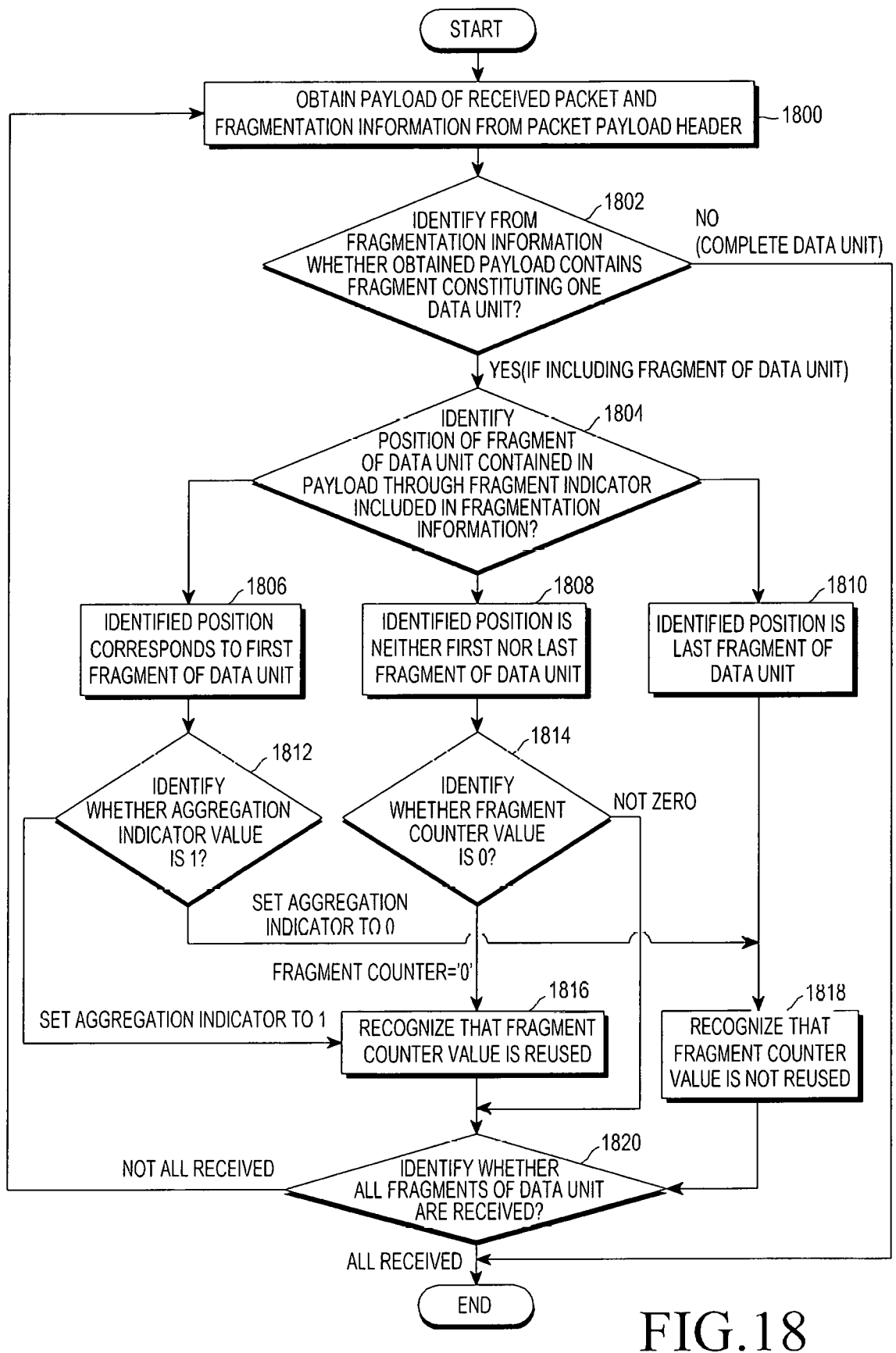
FIG. 18 is a flowchart illustrating another example of operation flow chart by a receive end according to an embodiment of the present disclosure.

According to another embodiment of the present disclosure, it is assumed that one data unit is split into multiple fragments, and the number of the split fragments is a which is smaller than the maximum value, e.g., X, representable with the size of the fragment counter field of the packet payload header. At this time, each fragment is contained in one payload, and the fragment counter value of each payload is counted to sequentially reduce by one from a−1 to 0. The fragment type of each payload indicates MFU. As another example, it is assumed that one data unit is split into a larger number, n*X+c, of fragments than the maximum value, X (where c is a positive integer equal or smaller than X). In this case, each split fragment is contained in one payload, and the fragment counter of each payload counts the value, starting from X−1, to sequentially reduce by 1 to zero for the first X consecutive payloads among the n*X+c consecutive payloads, allowing it to be reused (n−1) times in total, and counts the value, starting from c−1, to sequentially reduce by one to zero, for the last c payloads. According to an embodiment of the present disclosure, the aggregation flag (or aggregation indicator) of each payload is set to 1 for the first n*X consecutive payloads among the n*X+c consecutive payloads to indicate to reuse the fragment counter, and is set to 0 for the last c payloads. Here, the fragment indicator of each payload is denoted '01' where the corresponding payload contains the first fragment of the data unit, '10' where the fragment contained in the payload is neither the first nor last fragment of the data unit, and '11' where the fragment contained in the payload is the last fragment of the data unit. FIG. 18 is a flowchart illustrating another example of operations by a receive end according to an embodiment of the present disclosure. In the embodiment of FIG. 18, it is assumed that whether to reuse the fragment counter is set to, and indicated by, a particular value, e.g., 1, of the aggregation flag (or aggregation indicator).

Referring to FIG. 18, in steps 1800 to 1804, the MMT data packet receiving device 1300 performs the same operations as those in steps 1400 to 1404 of FIG. 14, and no detailed description thereof is given.

In step 1806, where, as a result of the identification, the obtained payload contains the first fragment of the data unit, the MMT data packet receiving device 1300 identifies whether the aggregation flag (or aggregation indicator) value is set to a particular value, e.g., 1, to indicate whether to reuse the fragment counter. Where, as a result of the identification, it is not set to "1," the MMT data packet receiving device 1300 goes to step 1818, recognizing that the fragment counter value is not reused. Where, as a result of the identification, it is set to "1," the MMT data packet receiving device 1300 goes to step 1816, recognizing that the fragment counter value is reused.

Where, as a result of the identification, the fragment contained in the obtained payload is neither the first nor last fragment of the data unit in step 1808, the MMT data packet receiving device 1300 goes to step 1814. In step 1814, the MMT data packet receiving device 1300 identifies whether the fragment counter value is 0. Where, as a result of the identification, it is set to 0, the MMT data packet receiving device 1300 may recognize that the fragment counter value is reused in step 1816. Also in this case, according to an embodiment of the present disclosure; the MMT data packet receiving device 1300, although there is no separate setting on whether the fragment counter is reused, may recognize that the fragment counter value is reused where the fragment indicator indicates that the fragment contained in the payload is neither the first nor last fragment of the data unit and the fragment counter value is 0.

Where, as a result of the identification, the fragment counter value is not 0, the MMT data packet receiving device 1300 goes to step 1820, identifying whether all the fragments split from the data unit have been received, and if all the fragments are identified to have been received, terminates the operation. Unless, as a result of the identification, all the fragments have been received, the MMT data packet receiving device 1300 goes back to step 1800, waiting to receive the next data packet.

Where, as a result of the identification in step 1804, the identified position is the end of the data unit in step 1810, the MMT data packet receiving device 1300 goes to step 1818, recognizing that the fragment counter value is not reused, and goes to step 1820.

According to embodiments of the present disclosure, where one data unit is split into a plurality of fragments, the number of the split fragments may precisely be calculated, and the fragmentation information configured based thereupon may be transmitted to the receive end. The receive end may efficiently reconfigure the received data packets into the multimedia data based on the fragmentation information.

Particular aspects of the present invention may be implemented as computer readable codes in a computer readable recording medium. The computer readable recording medium is a data storage device that may store data readable by a computer system. Examples of the computer readable recording medium may include read only memories (ROMs), random access memories (RAMs), compact disk-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain the present invention may be readily interpreted by skilled programmers in the art to which the present invention pertains.

The apparatuses and methods according to embodiments of the present invention may be implemented in hardware, software, or a combination of hardware and software. Such software may be recorded in volatile or non-volatile storage devices, such as ROMs, memories, such as RAMs, memory chips, memory devices, or integrated circuit devices, compact disks (CDs), DVDs, magnetic disks, magnetic tapes, or other optical or magnetic storage devices while retained in machine (e.g., computer)-readable storage media. The methods according to embodiments of the present invention may be implemented by a computer or a portable terminal including a controller and a memory, and the memory may be an exemplary machine-readable storage medium that may properly retain program(s) containing instructions for implementing the embodiments of the present invention.

Accordingly, the present disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the present disclosure properly includes the equivalents thereof.

The apparatuses according to embodiments of the present disclosure may receive the program from a program providing apparatus wiredly or wirelessly connected thereto and store the same. The program providing apparatus may include a memory for storing a program including instructions enabling the program processing apparatus to perform a method according to an embodiment of the present disclosure and information necessary for the method, a communication unit for performing wired or wireless communication with the program processing apparatus, and a controller transmitting the program to the program processing apparatus automatically or as requested by the program processing apparatus.

Although specific embodiments of the present disclosure have been described above, various changes may be made thereto without departing from the scope of the present disclosure. Thus, the scope of the present invention should not be limited to the above-described embodiments, and should rather be defined by the following claims and equivalents thereof.

The invention claimed is:

1. A method for receiving a data packet by a receiving apparatus in a multimedia system, the method comprising:
receiving the data packet;
obtaining, from a payload header of the received data packet, a fragment indicator including information about fragmentation of a data unit included in a payload of the received data packet and a fragment counter indicating a number of at least one payload containing at least one fragment of the data unit, the at least one payload following the payload of the received data packet; and
identifying that the fragment counter is to be reused in a case that the fragment indicator includes a value indicating that the payload contains a fragment of the data unit that is neither a first fragment nor a last fragment, and the fragment counter indicates that the number of the at least one payload is zero,
wherein a total number of fragments of the data unit is larger than a maximum number representable by the fragment counter, and
wherein the total number of the fragments of the data unit is counted based on the identification that the fragment counter is to be reused.

2. The method of claim 1, wherein a type of the data unit includes a media fragment unit (MFU).

3. The method of claim 1,
wherein the fragment counter indicates the number of the at least one payload by a value of N bits, and
wherein a number indicated by the fragment counter is included within a range of 0 to $2^N$, and N is an integer of 0 or more.

4. The method of claim 1, wherein the fragment counter is repeatedly reused based on the total number of fragments of the data unit.

5. A method for transmitting a data packet by a transmitting apparatus in a multimedia system, the method comprising:
generating a payload header and a payload; and
transmitting the data packet including the payload header and the payload,
wherein the payload header includes a fragment indicator including information about fragmentation of a data unit in a payload of the transmitted data packet and a fragment counter indicating a number of at least one payload, the at least one payload containing at least one fragment of the data unit the at least one payload following the payload of the transmitted data packet,
wherein the fragment counter is reused on a basis that a total number of fragments of the data unit is larger than a maximum number indicated by the fragment counter,
wherein it is identified that the fragment counter is to be reused based on the fragment indicator and the fragment counter,
wherein the fragment indicator includes a value indicating that the payload contains a fragment of the data unit that is neither a first fragment nor a last fragment,
wherein the fragment counter indicates that the number of the at least one payload is zero, and
wherein the total number of the fragments of the data unit is counted based on the identification that the fragment counter is to be reused.

6. The method of claim 5, wherein a type of the data unit includes a media fragment unit (MFU).

7. The method of claim 5,
wherein the fragment counter indicates the number of the at least one payload by a value of N bits, and
wherein a number indicated by the fragment counter is included within a range of 0 to $2^N$, and N is an integer of 0 or more.

8. The method of claim 5, wherein the fragment counter is repeatedly reused based on the total number of fragments of the data unit.

9. A receiving apparatus in a multimedia system, the receiving apparatus comprising:
a receiver configured to receive a data packet; and
a processor configured to:
obtain, from a payload header of the received data packet, a fragment indicator including information about fragmentation of a data unit included in a payload of the received data packet and a fragment counter indicating a number of at least one payload containing at least one fragment of the data unit, the at least one payload following the payload of the received data packet, and
identify that:
the fragment counter is to be reused in a case that the fragment indicator includes a value indicating that the payload contains a fragment of the data unit that is neither a first fragment nor a last fragment, and
the fragment counter indicates that the number of at least one payload is zero,
wherein a total number of fragments of the data unit is larger than a maximum number representable by the fragment counter, and
wherein the total number of the fragments of the data unit is counted based on identification that the fragment counter is to be reused.

10. The receiving apparatus of claim 9, wherein a type of the data unit includes a media fragment unit (MFU).

11. The receiving apparatus of claim 9, wherein the fragment counter indicates the number of the at least one payload by a value of N bits, and
wherein a number indicated by the fragment counter is included within a range of 0 to $2^N$, and N is an integer of 0 or more.

12. The receiving apparatus of claim 9, wherein the fragment counter is repeatedly reused based on the total number of fragments of the data unit.

13. A transmitting apparatus in a multimedia system, the transmitting apparatus comprising:
a processor configured to generate a payload header and a payload; and
a transmitter configured to transmit a data packet including the payload header and the payload,
wherein the payload header includes:
a fragment indicator including information about fragmentation of a data unit in a payload of the transmitted data packet, and
a fragment counter indicating a number of at least one payload, the at least one payload containing at least one fragment of the data unit, the at least one payload following the payload of the transmitted data packet,
wherein the fragment counter is reused on a basis that a total number of fragments of the data unit is larger than a maximum number indicated by the fragment counter,
wherein it is identified that the fragment counter is to be reused based on the fragment indicator and the fragment counter,
wherein the fragment indicator includes a value indicating that the payload contains a fragment of the data unit that is neither a first fragment nor a last fragment,
wherein the fragment counter indicates that the number of the at least one payload is zero, and
wherein the total number of the fragments of the data unit is counted based on the identification that the fragment counter is to be reused.

14. The transmitting apparatus of claim 13, wherein a type of the data unit includes a media fragment unit (MFU).

15. The transmitting apparatus of claim 13,
wherein the fragment counter indicates the number of the at least one payload by a value of N bits, and
wherein a number indicated by the fragment counter is included within a range of 0 to $2^N$, and N is an integer of 0 or more.

16. The transmitting apparatus of claim 13, wherein the fragment counter is repeatedly reused based on the total number of fragments of the data unit.

* * * * *